United States Patent
Parry-Williams et al.

(10) Patent No.: US 11,472,496 B2
(45) Date of Patent: Oct. 18, 2022

(54) SUSPENSION LINKAGE COVER

(71) Applicant: McLaren Automotive Limited, Surrey (GB)

(72) Inventors: Dan Parry-Williams, Surrey (GB); Roberto Della Ratta Rinaldi, Surrey (GB); Robin Algoo, Surrey (GB)

(73) Assignee: MCLAREN AUTOMOTIVE LIMITED, Surrey (GB)

( * ) Notice: Subject to any disclaimer, the term of this patent is extended or adjusted under 35 U.S.C. 154(b) by 340 days.

(21) Appl. No.: 16/593,064

(22) Filed: Oct. 4, 2019

(65) Prior Publication Data

US 2020/0108684 A1 Apr. 9, 2020

(30) Foreign Application Priority Data

Oct. 5, 2018 (GB) .................................... 1816288

(51) Int. Cl.
*B62D 35/02* (2006.01)
*B60G 99/00* (2010.01)
(Continued)

(52) U.S. Cl.
CPC ........... *B62D 35/02* (2013.01); *B60G 99/002* (2013.01); *B62D 37/02* (2013.01); *B60G 3/22* (2013.01);
(Continued)

(58) Field of Classification Search
CPC ........ B60G 3/18; B62D 35/005; B62D 35/02; B62D 37/02
(Continued)

(56) References Cited

U.S. PATENT DOCUMENTS

| 5,184,832 A | 2/1993 | Miwa |
| 8,979,102 B1 | 3/2015 | Prentice |

(Continued)

FOREIGN PATENT DOCUMENTS

| DE | 102013219211 A1 * | 3/2015 | ............ B60G 7/001 |
| DE | 102014014837 A1 * | 4/2016 | |

(Continued)

OTHER PUBLICATIONS

English translation of WO2018099753; retrieved Feb. 7, 2022 from PatentTranslate located at www.epo.org. (Year: 2018).*

(Continued)

*Primary Examiner* — Jason S Daniels
(74) *Attorney, Agent, or Firm* — Alston & Bird LLP

(57) ABSTRACT

A vehicle is provided that has a vehicle body, a wheel assembly, a suspension linkage, and a cover panel. The vehicle body has an underside and defines a wheel arch that forms an opening in the underside of the vehicle body. The suspension linkage runs within the wheel arch and couples the wheel assembly to the vehicle body to permit motion of the rotation axis of the wheel assembly relative to the vehicle body. The suspension linkage further comprises a first suspension link coupled between the vehicle body and the wheel assembly, whereby the cover panel is coupled to the first suspension link so that the cover panel moves with the first suspension link. The cover panel further extends across part of the opening so that in forward motion the cover panel directs a rearward moving airflow across the opening.

23 Claims, 6 Drawing Sheets

(51) Int. Cl.
  *B62D 37/02*  (2006.01)
  *B60G 3/22*   (2006.01)
(52) U.S. Cl.
  CPC .. *B60G 2204/20* (2013.01); *B60G 2204/4222* (2013.01)
(58) Field of Classification Search
  USPC .......................................... 296/180.1, 180.2
  See application file for complete search history.

(56) References Cited

U.S. PATENT DOCUMENTS

| | | | | |
|---|---|---|---|---|
| 9,643,664 | B2* | 5/2017 | Tesch | B62D 35/02 |
| 9,902,225 | B2* | 2/2018 | Riegelsberger | B62D 35/02 |
| 2011/0309652 | A1* | 12/2011 | Eichentopf | B62D 35/02 |
| | | | | 296/180.1 |
| 2013/0238198 | A1 | 9/2013 | Prentice | |
| 2016/0096409 | A1* | 4/2016 | Bromme | F16D 65/128 |
| | | | | 280/124.134 |
| 2016/0096560 | A1* | 4/2016 | Koremoto | B62D 35/00 |
| | | | | 296/180.1 |
| 2016/0280284 | A1* | 9/2016 | Scholz | B62D 25/2018 |
| 2019/0210667 | A1* | 7/2019 | Palmer | B62D 35/02 |

FOREIGN PATENT DOCUMENTS

| | | |
|---|---|---|
| DE | 102016215032 A1 | 2/2018 |
| DE | 102019206517 A1 * | 11/2020 |
| EP | 0030122 A1 | 6/1981 |
| WO | WO-2018/099745 A1 | 6/2018 |
| WO | WO-2018099753 A1 * | 6/2018 ............. B62D 35/02 |

OTHER PUBLICATIONS

Extended European Search Report for European Patent Application No. 19201476.9, dated Feb. 20, 2020, (8 pages), European Patent Office, Munich, Germany.

Intellectual Property Office, Unted Kingdom Search Report for Great Britain Patent Application No. GB1816288.3, dated Mar. 4, 2019, (3 pages), South Wales, United Kingdom.

* cited by examiner

SUSPENSION LINKAGE COVER

CROSS-REFERENCE TO RELATED APPLICATIONS

This application claims priority to and the benefit of United Kingdom Patent Application Serial No. 1816288.3; the contents of which as are hereby incorporated by reference in their entirety.

BACKGROUND

Various embodiments of the present invention relate to a vehicle comprising a cover panel extending across at least part of an opening so that when the vehicle is in forward motion the cover panel directs a rearward moving airflow across the opening.

The downforce generated by a vehicle can have a substantial effect on the cornering and braking capability of the vehicle. The downforce can be generated by having lower pressure air underneath the vehicle relative to the pressure of air around the vehicle. This can be achieved by a front splitter and a rear diffuser.

The front splitter attempts to cause a high-pressure area over the top of the splitter and a low-pressure area under the splitter. The high-pressure area is created by the air above the splitter being brought to stagnation, for example by an air dam. The low-pressure area is created by the air under the splitter being accelerated due to its the proximity to the ground which thus reduces the pressure of this air.

The rear diffuser is shaped to decelerate a rearwardly moving airflow from underneath the vehicle that is exiting at the rear of the vehicle and direct the air to expand into the region directly behind the vehicle. The rear diffuser helps increase downforce by assisting the flow of air under the vehicle by giving the flow of air a less impeded exit from behind the vehicle. The assistance in the expansion of the air behind the vehicle also reduces drag on the vehicle.

The combination of the front splitter and rear diffuser serve to assist in the generation of lower pressure air underneath the vehicle. Other elements of the vehicle can assist in the generation and sustaining of the low-pressure air underneath the vehicle. For instance, having a smooth surface to the underside of the vehicle means the air flowing under the vehicle is unimpeded and so is free to accelerate under the vehicle. Any regions on the underside of the vehicle that causes the airflow to be impeded can therefore affect the ability of the vehicle to generate downforce.

It would therefore be desirable for there to be a way of improving the downforce generated by a vehicle.

BRIEF SUMMARY

According to a first aspect of the present invention there is provided a vehicle having an underside comprising: a vehicle body having an underside, the vehicle body defining a wheel arch, the wheel arch forming an opening in the underside of the vehicle body; a wheel assembly having a rotation axis, the wheel assembly being positioned in the wheel arch and extending through the opening to the underside of the vehicle; a suspension linkage running within the wheel arch, the suspension linkage coupling the wheel assembly to the vehicle body to permit motion of the rotation axis of the wheel assembly relative to the vehicle body, the suspension linkage comprising a first suspension link coupled between the vehicle body and the wheel assembly; and a cover panel coupled to the first suspension link so that the cover panel moves with the first suspension link, the cover panel extending across at least part of the opening so that when the vehicle is in forward motion the cover panel directs a rearward moving airflow across the opening.

The suspension linkage may comprise a second suspension link coupled between the vehicle body and the wheel assembly, wherein the first suspension link may be a lower suspension link and the second suspension link may be an upper suspension link and the cover panel may be coupled to the lower suspension link. The wheel assembly may comprise a wheel, the wheel arch may form an opening in a side of the vehicle body, the opening in the underside of the vehicle body may comprise an inner surface located opposite to the opening in the side of the vehicle body, and the cover panel may extend, in a lateral direction of the vehicle, across at least part of the opening in the underside of the vehicle body from the inner surface of the opening in the underside of the vehicle body to an inner surface of the wheel.

The cover panel may extend across the opening in the underside of the vehicle body from a region near the inner surface of the opening in the underside of the vehicle body to a region near the inner surface of the wheel. The cover panel may be substantially flush with the inner surface of the opening in the underside of the vehicle body. The cover panel may be substantially flush with the inner surface of the wheel. Where the cover panel meets the inner surface of the opening in the underside of the vehicle body, the cover panel may be configured to provide sealing between the cover panel and the inner surface of the opening in the underside of the vehicle body. The inner surface of the opening in the underside of the vehicle body may comprise a projection and the cover panel may be contoured to fit over that projection. The projection may extend in an upward direction and the cover panel may fit over that projection from above. The cover panel may comprise an inverted U-shape portion which fits over the projection.

The cover panel may be configured to cause the rearward moving airflow to be guided along the cover panel from a leading edge of the cover panel to a trailing edge of the cover panel. The cover panel may comprise a cover panel base, and two lips projecting from the cover panel base in a downward direction, the lips may run from a leading edge of the cover panel to a trailing edge of the cover panel.

The cover panel may extend, in a longitudinal direction of the vehicle, across at least part of the opening in the underside of the vehicle body from a front surface of the opening in the underside of the vehicle body to a rear surface of the opening in the underside of the vehicle body. The cover panel may extend across the opening in the underside of the vehicle body from a region near the front surface of the opening in the underside of the vehicle body to a region near the rear surface of the opening in the underside of the vehicle body. The cover panel may be substantially flush with the front surface of the opening in the underside of the vehicle body. The cover panel may be substantially flush with the rear surface of the opening in the underside of the vehicle. The cover panel may overlap with the rear surface of the opening in the underside of the vehicle.

The cover panel may comprise a curved profile in a longitudinal direction of the vehicle. The vehicle may have a rear, the vehicle may comprise a rear diffuser, and the rear diffuser may comprise: a first air channel configured to direct air from a first inlet at the underside of the vehicle to a first outlet at the rear of the vehicle; and the cover panel may be aligned with first inlet of the first air channel. The vehicle may comprise an air duct configured to channel air from a region in front of the cover panel to the cover panel.

The vehicle may comprise an air duct, the air duct may run between an inlet and an outlet, the outlet may be located in the wheel arch. The vehicle may comprise a door sill and wherein the inlet may be located on the door sill. The inlet may be formed as a groove in the door still which as the duct runs towards the rear of the vehicle becomes enclosed and forms the duct.

The wheel assembly may be a first wheel assembly, the suspension linkage may be a first suspension linkage, the cover panel may be a first cover panel, the wheel arch may be a first wheel arch form a first opening in the underside of the vehicle body, and the vehicle body may define a second wheel arch, the second wheel arch may form a second opening in the underside of the vehicle body, and the vehicle may comprise: a second wheel assembly having a rotation axis, the second wheel assembly may be positioned in the second wheel arch and extending through the second opening to the underside of the vehicle; a second suspension linkage running within the second wheel arch, the second suspension linkage may couple the second wheel assembly to the vehicle body to permit motion of the rotation axis of the second wheel assembly relative to the vehicle body, the second suspension linkage may comprise a third suspension link coupled between the vehicle body and the second wheel assembly; and a second cover panel coupled to the third suspension link so that the cover panel moves with the third suspension link, the second cover panel may extend across at least part of the second opening so that when the vehicle is in forward motion the second cover panel directs a rearward moving airflow across the second opening.

The wheel arch(es) may be rear wheel arch(es).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
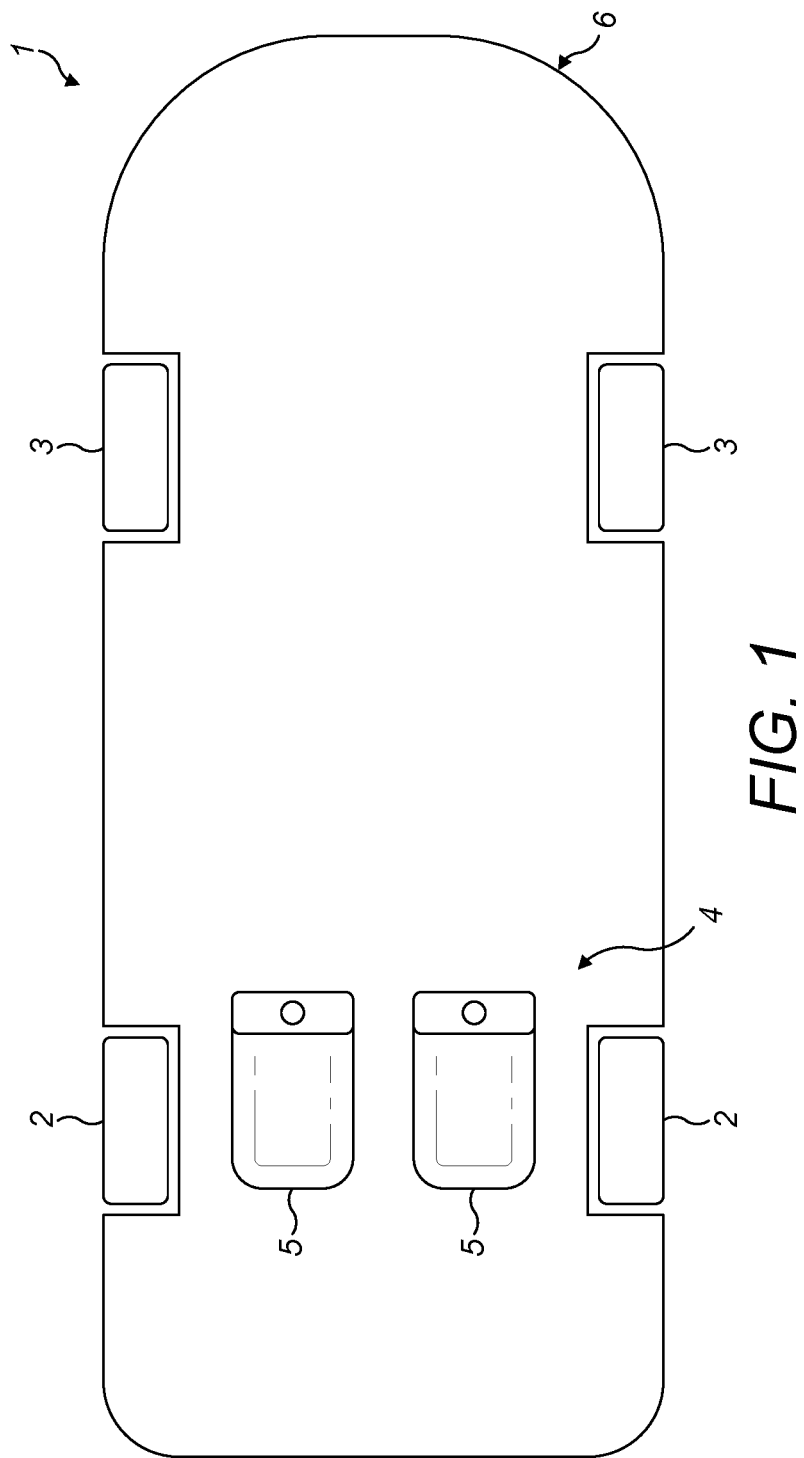
FIG. 1 shows a plan schematic view of the vehicle from above the vehicle.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Various modifications to the disclosed embodiments will be readily apparent to those skilled in the art. The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising a vehicle body having an underside, the vehicle body defining a wheel arch, and the wheel arch forming an opening in the underside of the vehicle body. The vehicle also comprising a wheel assembly having a rotation axis, the wheel assembly being positioned in the wheel arch and extending through the opening to the underside of the vehicle. The vehicle also comprising a suspension linkage running within the wheel arch, the suspension linkage coupling the wheel assembly to the vehicle body to permit motion of the rotation axis of the wheel assembly relative to the vehicle body, and the suspension linkage comprising a first suspension link coupled between the vehicle body and the wheel assembly. The vehicle further comprising a cover panel coupled to the first suspension link so that the cover panel moves with the first suspension link, the cover panel extending across at least part of the opening so that when the vehicle is in forward motion the cover panel directs a rearward moving airflow across the opening.

Alternatively, there may be a vehicle comprising a vehicle body having an underside, the underside comprising an opening in vehicle body. The vehicle also comprising a wheel assembly having a rotation axis, the wheel assembly being positioned in the wheel arch and extending through the opening to the underside of the vehicle. The vehicle also comprising a suspension linkage running within a region located above the opening, the suspension linkage coupling the wheel assembly to the vehicle body to permit motion of the rotation axis of the wheel assembly relative to the vehicle body, and the suspension linkage comprising a first suspension link coupled between the vehicle body and the wheel assembly. The vehicle further comprising a cover panel coupled to the first suspension link so that the cover panel moves with the first suspension link, the cover panel extending across at least part of the opening so that when the vehicle is in forward motion the cover panel directs a rearward moving airflow across the opening.

Figure 2:
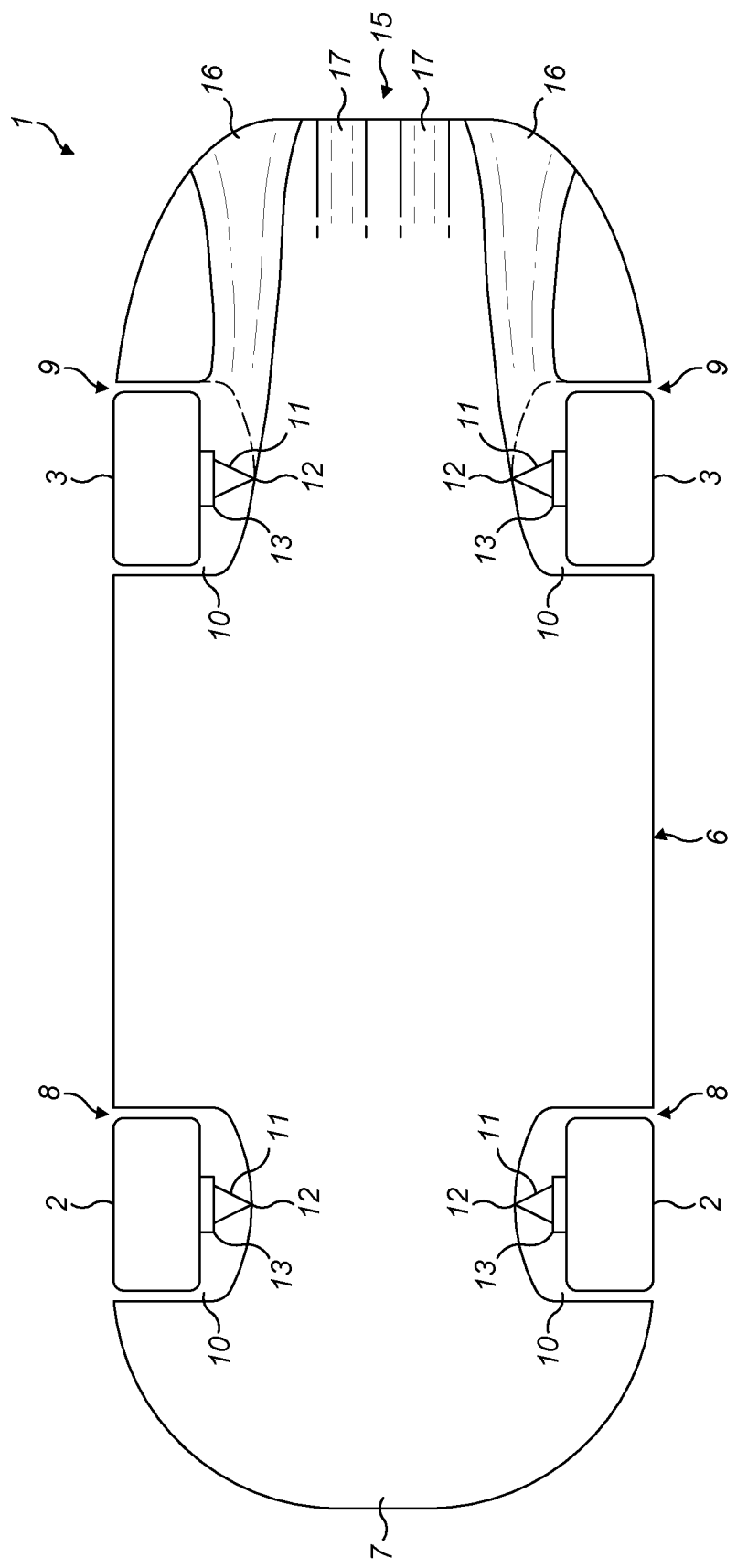
FIG. 2 shows a plan schematic view of the vehicle from underneath the vehicle with certain parts of the vehicle removed for clarity.
Figure 3:
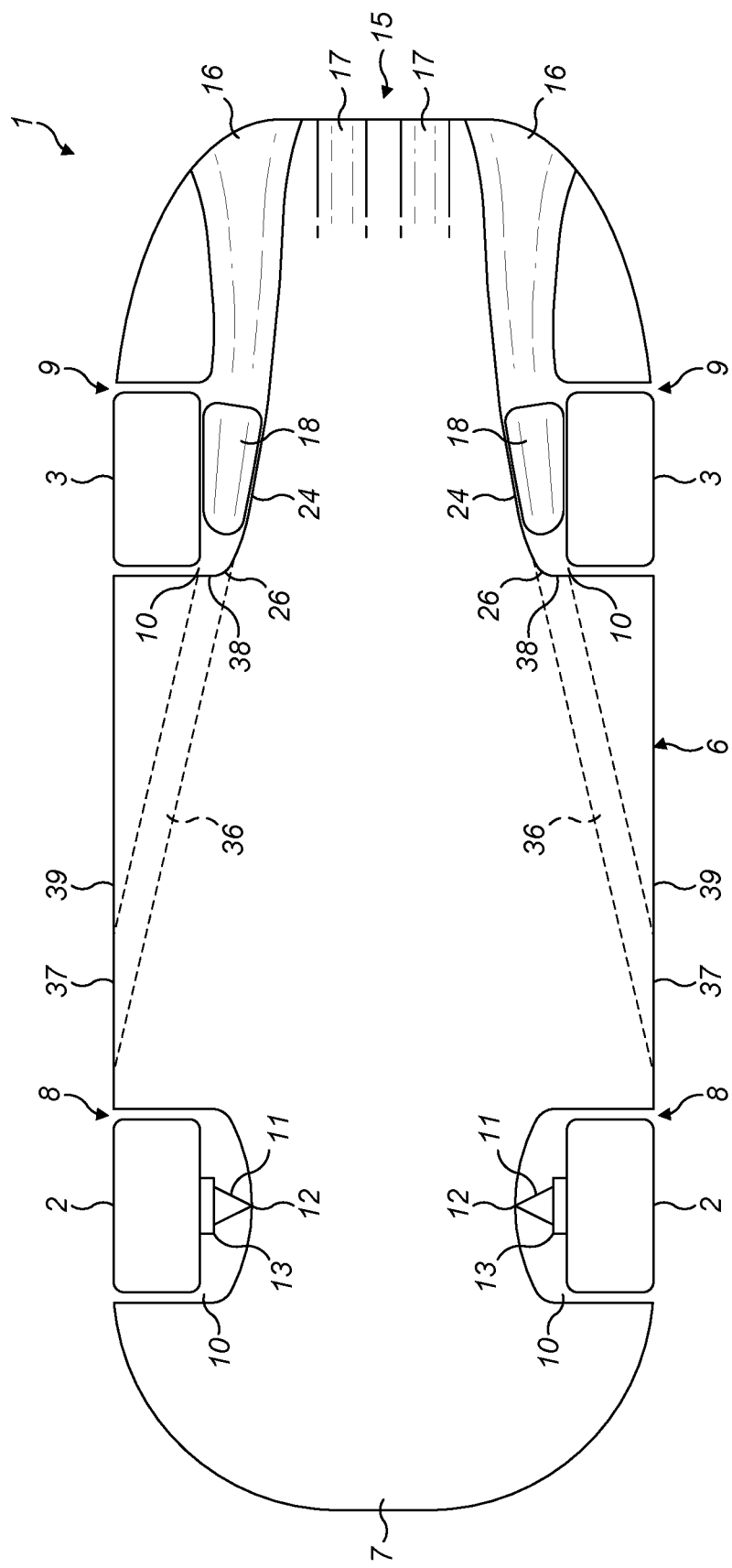
FIG. 3 shows a plan schematic view of the vehicle with parts present that were removed in FIG. 2.

FIGS. 1, 2 and 3 show a vehicle 1. FIG. 1 shows a plan schematic view of the vehicle 1 from above the vehicle. FIG. 2 shows a plan schematic view of the vehicle 1 from underneath the vehicle 1 with certain parts of the vehicle 1 removed for clarity. FIG. 3 shows a plan schematic view of the vehicle 1 with parts present that were removed in FIG. 2.

The vehicle 1 may be an automobile. The vehicle 1 may be a car. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment 4 may accommodate a driver. The occupant compartment 4 may accommodate one or more passengers. The vehicle 1 may comprise controls located within the occupant compartment 4 to enable an occupant to control the motion of the vehicle.

The vehicle comprises a vehicle body 6. The vehicle body 6 comprises a plurality of body panels. For example, the body panels may include bonnet panels, side door panels, roof panels and rear deck panels. Each of these listed example areas of body panels may be formed of one or more body panels.

The vehicle body 6 has an underside 7 as shown in FIGS. 2 and 3. The underside of the vehicle 6 may be formed of a plurality of panels that together form the underside of the vehicle 6. The underside 7 of the vehicle may be substantially flat to assist in creating downforce due to ground effect.

The vehicle body 6 forms a plurality of wheel arches. The vehicle body 6 comprises a wheel arch per wheel 2, 3. As shown in FIGS. 1 to 3, the vehicle 1 comprises four wheel arches: two front wheel arches 8 and two rear wheel arches 9. Positioned in each front and rear wheel arch 8, 9 is a front or rear wheel 2, 3 respectively. The wheel arches each form an opening 10 in the underside 7 of the vehicle body 6 through which the respective wheel 2, 3 extends. The openings 10 permits each wheel 2, 3 to contact a running surface on which the wheels can support the vehicle 1. The wheels 2, 3 extend through the openings 10 to the underside of the vehicle. The underside of the vehicle being the region between the underside 7 of the vehicle body 6 and the running surface that the vehicle 1 is supported on by the wheels 2, 3.

The vehicle comprises a suspension system for supporting the vehicle body 3 on wheels 2, 3. The suspension system comprises a suspension linkage 11 coupled between a wheel 2, 3 and at least one mounting point 12 on the vehicle body 6. Therefore, there may be one suspension linkage 11 per wheel 2, 3. Each suspension linkage 11 runs within its respective wheel arch 8, 9. Each wheel 2, 3 is typically mounted on bearings 13, and thus suspension linkage 11 may be coupled between a wheel bearing 13 and a vehicle body mounting point 12. The wheel 2, 3 can rotate about a rotation axis to permit movement on a motion surface such as a road. This rotation axis may be defined by wheel bearing 13. The wheel 2, 3 together with ancillary items such as bearings 13 and, for example, a wheel brake together may form a wheel assembly. Thus, each wheel assembly may have a rotation axis associated with it about which the wheel assembly turns to permit movement on the motion surface. Each wheel assembly is therefore positioned within a respective wheel arch of the vehicle. The wheel assembly, by means of the wheel, extends through the opening in the underside of the vehicle defined by the wheel arch Suspension linkage 11 may be constituted by a single link. It will be appreciated that suspension linkage 11 may be constituted by a more complicated arrangement of linkages to couple each wheel 2, 3 to the vehicle body 6 as required by the particular motion requirements of wheels 2, 3. For instance, suspension linkage 11 may be a wishbone linkage as illustrated in FIGS. 2 and 3 or alternatively suspension linkage 11 may be a double wishbone linkage.

Each suspension linkage 4 permits motion of the suspension linkage's 4 respective wheel 2 relative to vehicle body 3. Each suspension linkage 4 has a movement range which is the total motion range of the wheel 2 relative to the vehicle body 3. Generally, suspension linkage 4 permits the wheel 2 to move in with a generally vertical movement. Other motions of the wheel 2 may also be permitted by suspension linkage 4, for instance the camber of wheel 2 may be permitted to alter and/or the position of the hub/bearing 6 of the wheel may be permitted to move in a lateral direction over the movement range of the suspension linkage 4.

Figure 4:
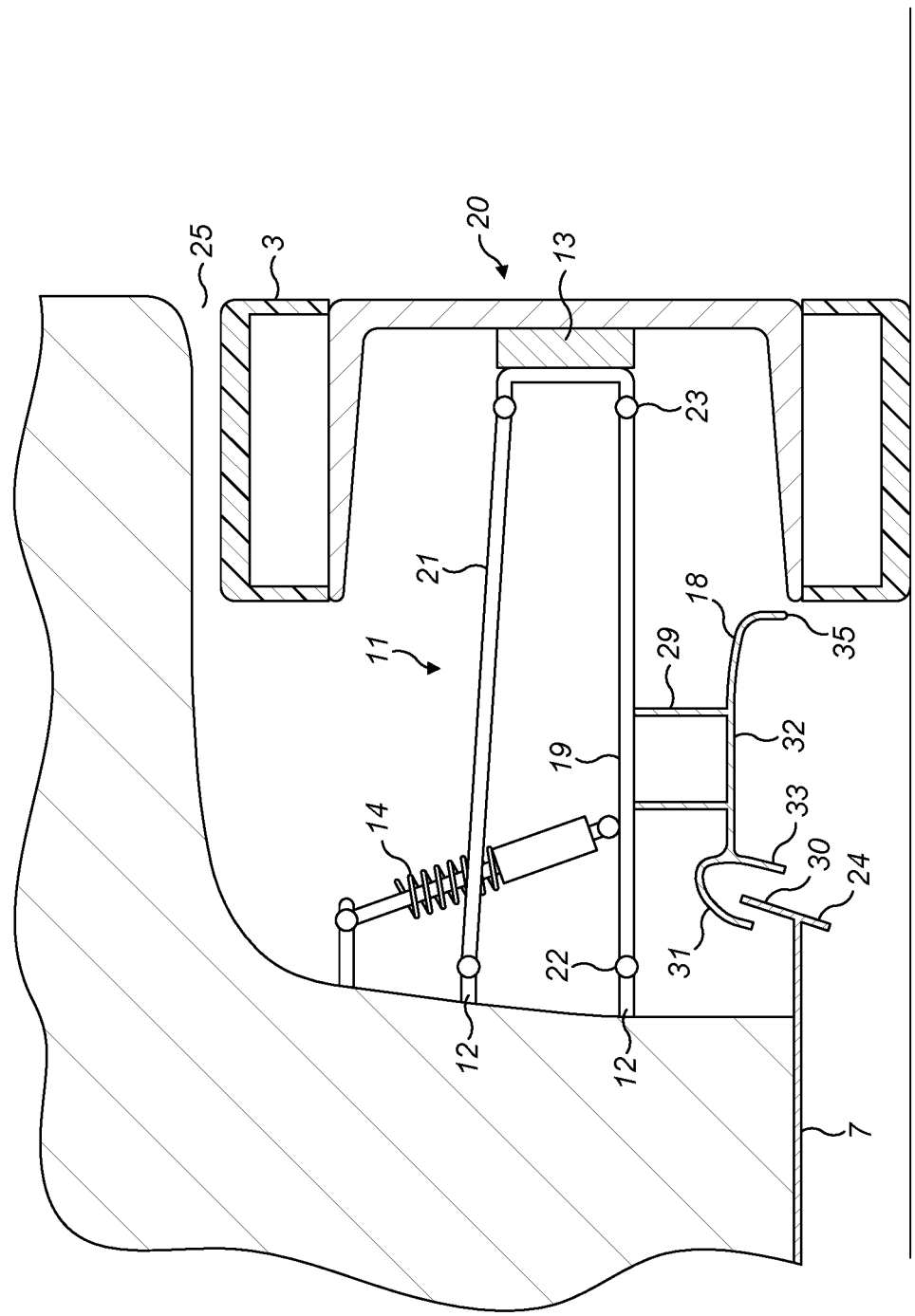
FIG. 4 shows a schematic side cut through view, in a lateral direction of the vehicle, of a rear wheel arch and the associated components.
Figure 5:
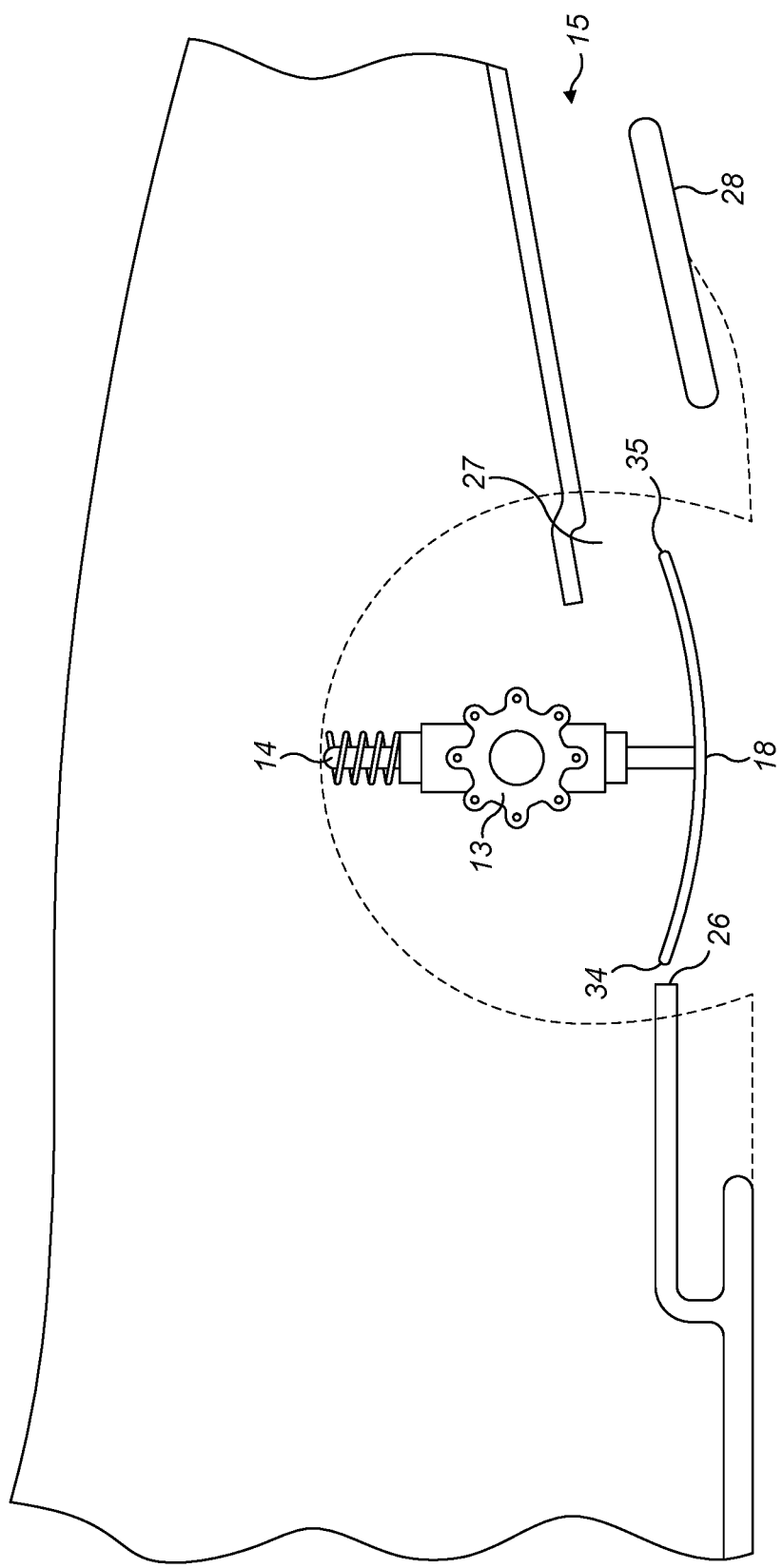
FIG. 5 shows a schematic side cut through view, in a longitudinal direction of the vehicle, of the rear wheel arch and the associated components.

As shown in FIGS. 4 and 5, to control the motion of the wheels 2, 3 relative to the vehicle body 6 over the suspension linkage's 11 motion range the vehicle 1 comprises at least one damper 14 associated with the suspension linkage 11. The damper 14 is coupled to the suspension linkage 11 to constrain the motion of the suspension linkage 11 over the motion range. The at least one damper 14 may be coupled between suspension linkage 11 and vehicle body 6 to constrain the motion of suspension linkage 11. Alternatively, or as well as, at least one damper 14 may be coupled between elements of the suspension linkage 11 to constrain the motion of suspension linkage.

The vehicle 1 may comprise a rear diffuser 15. The rear diffuser 15 is shaped to decelerate a rearwardly moving airflow from underneath the vehicle that is exiting at the rear of the vehicle and direct the air to expand into the region directly behind the vehicle 1. The assistance in the expansion of the air behind the vehicle 1 reduces drag on the vehicle. In addition, the rear diffuser 15 helps increase downforce by assisting the flow of air under the vehicle 1 by giving the flow of air a less impeded exit from behind the vehicle. The rear diffuser 15 can comprise a plurality of aerodynamic elements such as channels 16, 17 and wings 28. The rear diffuser may comprise two air channels 16 positioned on opposite sides of a longitudinal centreline of the vehicle. The two air channels 16 may each run from a respective rear wheel arch 9 to the rear of the vehicle. Each of the two air channels 16 may run in a direction substantially parallel to the longitudinal direction of the vehicle 1 from the respective rear wheel arch 9 to the rear of the vehicle. The air channels 16 may run to the rear end of the vehicle 1. The air channels 16 may be open, at least partially, to the underside of the vehicle 1 over their length.

As discussed above, FIG. 2 shows the underside 7 of the vehicle 1 with certain components removed that are present in FIG. 3. This is done so that the rear suspension linkages 11 are shown which are masked in FIG. 3 by two cover panels 18.

FIG. 4 shows a schematic side cut through view, in a lateral direction of the vehicle 1, of a rear wheel arch 9 and the associated components. The suspension linkages 11 comprise a first suspension link 19 coupled between the vehicle body 6 and the rear wheel assembly 20. The first suspension link 19 is rotatably attached to the vehicle body 6 and rotatably attached to the rear wheel assembly 20. The first suspension link 19 may be attached to the vehicle body 6 by means of a first revolute joint 22. The second suspension link 21 may be attached to the vehicle body 6 by means of a second revolute joint 23.

The cover panel 18 is attached to a respective first suspension link 19. The cover panel 18 is not attached to a respective second suspension link 21. Whilst the cover panel 18 is attached to second suspension link 21 via other components such as the vehicle body 6 or the wheel assembly 20 it is not directly attached to the second suspension link 21. The first suspension link 19 may be a wishbone link as pictured in FIG. 2. The first suspension link 19 may be a lower suspension link with the suspension linkages 11 also comprising an upper suspension link 21. The lower suspension link 19 being connected between the vehicle body 6 and the wheel assembly 20 at a lower level than the upper suspension link 21. The suspension linkages 11 may comprise a plurality of suspension links of which first suspension link 19 is at least one of the lowest within the wheel arch 9. Each of the suspension links may be rotatably attached to the vehicle body 6 and to the wheel assembly 20.

The cover panel 18 is coupled to the first suspension link 19 so that the cover panel 18 moves with the first suspension link 19. The cover panel 18 may be coupled to the first suspension link so that a movement of the first suspension link 19 causes a corresponding movement in the cover panel 18. The cover panel 18 and the first suspension link 19 may move in unison.

The cover panel 18 may be coupled to the first suspension link 19 by any suitable means. For example, as shown in FIGS. 4 and 5, the body of the cover panel 18 may be attached to the first suspension link 19 by extensions 29 to the cover panel which extend away from the body of the cover panel 18. The extensions 29 may be adjustable to enable the correct initial positioning of the cover panel 18.

The cover panel 18 extends across at least part of the opening 10 in the underside 7 of the vehicle body 6. The wheel arch 9 forms an opening 25 in the side of the vehicle body. The wheel 2, 3 is positioned in the opening 25 in the side of the vehicle body. The wheel 2, 3 may extend through the opening 25 in the side of the vehicle body 6. Alternatively, wheel 2, 3 may be set back from the opening 25 in the side of the vehicle body 6 or be flush with the opening 25. The opening 10 in the underside of the vehicle body 6 comprises an inner surface 24 located opposite to the opening in the side of the vehicle body 6.

In the lateral direction of the vehicle 1, the cover panel 18 extends across at least part of the opening from the inner surface 24 of the opening 10 in the underside 7 to the inner surface of the wheel 3. The inner surface of the wheel 3 being the surface of the wheel facing away from the opening in the side of the vehicle body. As pictured in FIGS. 3 and 4, the cover panel 18 extends across the opening 10 from a region near the inner surface 24 of the opening 10 in the underside 7 to a region near the inner surface of the wheel 3. The cover panel 18 may be substantially flush with the inner edge 24 of the opening 10 in the underside 7. The cover panel 18 may be substantially flush with the inner surface of the wheel 3. The inner surface of the wheel being the surface of the wheel directed away from the opening 25 in the side of the vehicle body 6 associated with its respective wheel arch 9.

As pictured in FIG. 4, the cover panel 18 may be shaped to cause a rearwardly moving airflow to be contained within the longitudinal extension of the cover panel. In this way the airflow is directed across the wheel arch. The cover panel 18 comprises lips 33 that project from a base 32 of the cover panel 18. The lips 33 project in a downward direction away from the base 32 of the cover panel.

Where the cover panel 18 meets the inner surface 24 of the opening 10 the cover panel 18 may be shaped to provide sealing between the cover panel 18 and the inner surface 24. The inner surface 24 of the opening comprises a projection 30 which extends in an upward direction. The projection 30 extends in a different direction to that of the underside of the vehicle body. The projection 30 may extend substantially perpendicular to the underside of the vehicle body. On the side of the cover panel 18 that in adjacent to the inner surface 24 of the opening, the cover panel 18 is contoured to fit over the projection 30. The cover panel 18 is contoured so that provides only a small gap between the cover panel 18 and the projection 30. As the cover panel 18 can move with the suspension link, the depth of the contour is such that the projection 30 is retained within the contoured part of the cover panel over the motion range of the cover panel 18. As shown in FIG. 4, the cover panel 18 comprises an inverted U-shape 31 with the U-shape fitting over the projection 30. The depth of the U-shape is such that the projection 30 retained within the U-shape over the motion range of the cover panel.

FIG. 5 shows a schematic side cut through view, in a longitudinal direction of the vehicle, of a rear wheel arch 9 and the associated components. The wheel has been removed to enable parts behind the wheel to be shown. In the longitudinal direction of the vehicle 1, the cover panel 18 extends across at least part of the opening 10 in the underside 7 from a front surface 26 of the opening 10 in the underside 7 to a rear surface 27 of the opening 10 in the underside 7. As pictured in FIGS. 3 and 5, the cover panel 18 extends across the opening 10 from a region near the front surface 26 of the opening to a region near the rear surface 27 of the opening 10. The cover panel 18 may be substantially flush with the front surface 26 of the opening 10 in the underside 7. The cover panel 18 may be substantially flush with the rear surface 27 of the opening 10 in the underside 7. As shown in FIG. 5, there may be some overlap between the cover panel 18 and the rear surface 27 of the opening 10 in the underside 7. Therefore, the cover panel 18 may overlap the rear surface 27 of the opening in the underside 7. This is because when the vehicle is in forward motion the cover panel can then guide a rearward flow of air across the opening and ensure the airflow is channeled to another part of the vehicle body rather than entering the wheel arch. There may be no overlap between the cover panel 18 and the front surface 26 of the opening 10 in the underside 7.

Whilst the cover panel 18 is pictured as not being in contact with either the wheel or the wheel arch, the cover panel 18 can still provide a seal against those surfaces. This is because the cover panel 18 is close enough to those surfaces to mean that an air seal is generated between the cover panel 18 and those surfaces. This is because only a small amount of air can travel through the gap meaning that in effect a seal is produced between the cover panel and the surface.

In the longitudinal direction, the cover panel 18 has a curved profile with the leading 34 and trailing edges 35 of the cover panel 18 being located higher than the middle of the cover panel 18. The cover panel 18 may be only slightly curved. The profile of the cover panel 18 is such that the airflow running along the underside of the vehicle body can be collected by the cover panel at the leading edge 34, guided across the opening of the wheel arch, and guided towards the rear of the vehicle off the trailing edge 35 of the cover panel 18.

The cover panel 18 herein described provides a way in which a rearward airflow, generated when the vehicle is in forward motion, can be guided across the opening in the underside of the vehicle body created by a wheel arch. This can increase the downforce generated by the vehicle because it means the airflow under the vehicle has a less impeded flow than it would otherwise do if the cover panel was not present. The cover panel thus forms a duct on the underside of the vehicle to direct the airflow across the wheel arch opening. If the cover panel was not present, an amount of the rearward airflow would flow into the wheel arch thus meaning that this air would not flow to the rear of the vehicle. This would disrupt the ground effect being used by the vehicle to generate downforce and so mean less downforce would be created by the vehicle.

As pictured in FIG. 3, the cover panels are particularly advantageous when the vehicle 1 comprises a rear diffuser 15. As described herein, the rear diffuser 15 can comprise two air channels 16 positioned on opposite sides of the longitudinal center line of the vehicle 1. The inlets of those channels 15 are positioned so that they can accept the rearwardly moving airflow, generated when the vehicle is in forward motion, that has been guided over the opening in the underside 7 of the vehicle body 6. The inlets of those channels 15 may be positioned in line with the cover panels 18. In this way the cover panels 18 can direct the rearwardly moving airflow into the inlets of the air channels 15. This assists in the operation of the rear diffuser 15 which helps to increase the downforce generated by the vehicle 1.

To aid the flow of air across the underside of the vehicle, and in particular over the cover panels and into the rear diffuser 15, the vehicle may comprise a duct 36 on each side of the vehicle which channels air from a region in front of the cover panel 18 to the cover panel 18. The duct 36 runs between an inlet 37 and an outlet 38. The vehicle 1 comprises door sills 39. The door sills 39 may run the length of the vehicle 1 between the front and rear wheels 2, 3. The inlet 37 for each duct may be located on the door sill 39 on the respective side of the vehicle 1. As shown in FIG. 3, the inlet 37 is formed a part of the door sill 39. The inlet 37 is formed as a groove in the door sill 39 which as the duct 36 runs towards the rear of the vehicle becomes enclosed and thus forms the duct 36. The duct 36 then runs towards the rear of the vehicle 1 to outlet 38. Outlet 38 is located within the rear wheel arch 9. As shown in FIG. 3, outlets 38 may be aligned with the respective cover panel 18 located in the opening of that rear wheel arch 9.

Figure 6A:
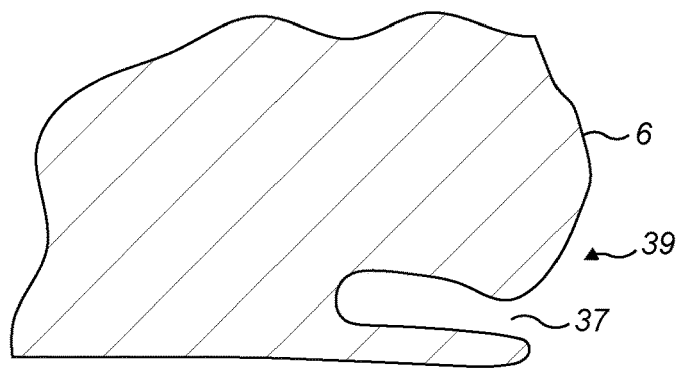
FIGS. 6A to 6C show cross sectional views of a duct.
Figure 6B:
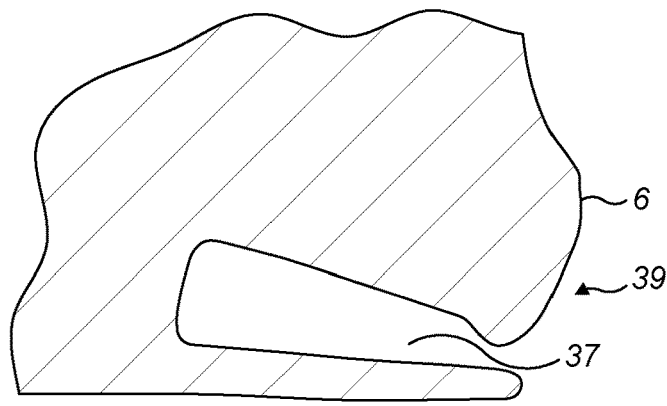
Figure 6C:
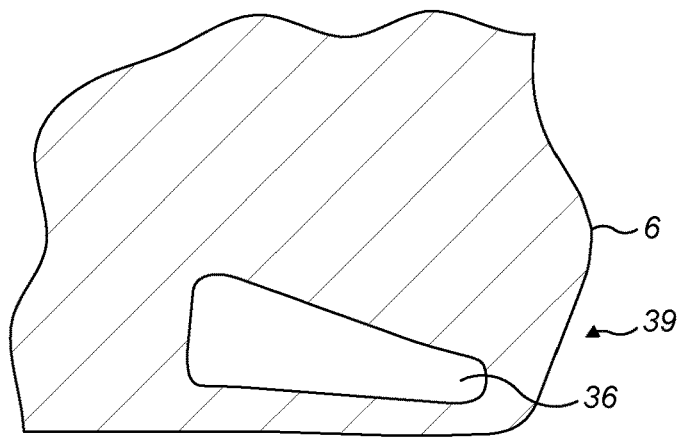

The profile of the duct 36 is shown in FIGS. 6A to 6C. FIGS. 6A to 6C show cross sections, in a lateral direction across the vehicle 1, of the duct 36 as it runs towards the rear of the vehicle 1. FIG. 6A shows part of the inlet 37 of the duct 36. In this figure, the inlet 37 is a groove in the door sill 39 of the vehicle 1. FIG. 6B shows a second part of the inlet 37 further along the vehicle 1 towards the rear of the vehicle 1. In this figure the groove is shown as closing to form the body of the duct 36. FIG. 6C shows the duct 36 once the groove has closed to form the body of the duct 36. The duct 36 then runs to the outlet 38.

The use of the ducts 36 are particularly advantageous when combined with both the cover panel 18 and the rear diffuser 15 having two channels 16 as described herein. This is because the ducts 36 channel air to the rear diffuser 15 which can be used to increase the downforce generated by the vehicle 1. They channel the air to the cover panel which then stops a substantial quantity of the airflow from entering the wheel arch and instead presents it to the channels 16 of the rear diffuser 15. The rear diffuser 15 can then use this airflow to improve the downforce of the vehicle and/or reduce the drag generated by the vehicle.

Whilst the discussion of the cover panels 18 has focused on their attachment to suspension linkages associated with the rear wheel arches, it will be appreciated that the cover panels 18 could also be used advantageously on the suspension linkages associated with the front wheel arches. In addition, the underside of the vehicle body may form an opening through which the suspension linkage moves, but the side of the vehicle body may not form a wheel arch. For instance, this may be because the vehicle is a race car that does not have wheel arches. In this case, the cover panel(s) may still direct airflow across the opening but the wheel arch(es) may not be present.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Many modifications and other embodiments of the invention set forth herein will come to mind to one skilled in the art to which these inventions pertain having the benefit of the teachings presented in the foregoing descriptions and the associated drawings. Therefore, it is to be understood that the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A vehicle having an underside comprising:
   a vehicle body having an underside, the vehicle body defining a wheel arch, the wheel arch forming: an opening in the underside of the vehicle body and an opening in a side of the vehicle body, the opening in the underside of the vehicle body comprising an inner surface located opposite to the opening in the side of the vehicle body, the inner surface comprising a projection;
   a wheel assembly having a rotation axis, the wheel assembly being positioned in the wheel arch and extending through the opening to the underside of the vehicle;
   a suspension linkage running within the wheel arch, the suspension linkage coupling the wheel assembly to the vehicle body to permit motion of the rotation axis of the wheel assembly relative to the vehicle body, the suspension linkage comprising a first suspension link coupled between the vehicle body and the wheel assembly; and
   a cover panel coupled to the first suspension link so that the cover panel moves with the first suspension link, the cover panel being contoured to fit over the projection, the cover panel further extending across at least part of the opening so that when the vehicle is in forward motion the cover panel directs a rearward moving airflow across the opening.

2. The vehicle according to claim 1, wherein:
   the suspension linkage comprises a second suspension link coupled between the vehicle body and the wheel assembly, and
   the first suspension link is a lower suspension link, the second suspension link is an upper suspension link, and the cover panel is coupled to the lower suspension link.

3. The vehicle according to claim 1, wherein:
   the wheel assembly comprises a wheel, and
   the cover panel extends, in a lateral direction of the vehicle, across at least part of the opening in the underside of the vehicle body from the inner surface of the opening in the underside of the vehicle body to an inner surface of the wheel.

4. The vehicle according to claim 3, wherein the cover panel extends across the opening in the underside of the vehicle body from a region near the inner surface of the opening in the underside of the vehicle body to a region near the inner surface of the wheel.

5. The vehicle according to claim 3, wherein the cover panel is substantially flush with the inner surface of the opening in the underside of the vehicle body.

6. The vehicle according to claim 3, wherein the cover panel is substantially flush with the inner surface of the wheel.

7. The vehicle according to claim 3, wherein, where the cover panel meets the inner surface of the opening in the underside of the vehicle body, the cover panel is configured to provide sealing between the cover panel and the inner surface of the opening in the underside of the vehicle body.

8. The vehicle according to claim 1, wherein the projection extends in an upward direction and the cover panel fits over that projection from above.

9. The vehicle according to claim 1, wherein the cover panel comprises an inverted U-shape portion which fits over the projection.

10. The vehicle according to claim 1, wherein the cover panel is configured to cause the rearward moving airflow to be guided along the cover panel from a leading edge of the cover panel to a trailing edge of the cover panel.

11. The vehicle according to claim 1, wherein the cover panel comprises a cover panel base, and two lips projecting from the cover panel base in a downward direction, the lips running from a leading edge of the cover panel to a trailing edge of the cover panel.

12. The vehicle according to claim 1, wherein the cover panel extends, in a longitudinal direction of the vehicle, across at least part of the opening in the underside of the vehicle body from a front surface of the opening in the underside of the vehicle body to a rear surface of the opening in the underside of the vehicle body.

13. The vehicle according to claim 12, wherein the cover panel extends across the opening in the underside of the vehicle body from a region near the front surface of the opening in the underside of the vehicle body to a region near the rear surface of the opening in the underside of the vehicle body.

14. The vehicle according to claim 12, wherein the cover panel is substantially flush with the front surface of the opening in the underside of the vehicle body.

15. The vehicle according to claim 12, wherein the cover panel is substantially flush with the rear surface of the opening in the underside of the vehicle.

16. The vehicle according to claim 12, wherein the cover panel overlaps with the rear surface of the opening in the underside of the vehicle.

17. The vehicle according to claim 1, wherein the cover panel comprises a curved profile in a longitudinal direction of the vehicle.

18. The vehicle according to claim 1, wherein the vehicle has a rear, the vehicle comprises a rear diffuser, and the rear diffuser comprises: a first air channel configured to direct air from a first inlet at the underside of the vehicle to a first outlet at the rear of the vehicle; and the cover panel being aligned with first inlet of the first air channel.

19. The vehicle according to claim 1, wherein the vehicle comprises an air duct configured to channel air from a region in front of the cover panel to the cover panel.

20. The vehicle according to claim 1, wherein the vehicle comprises an air duct, the air duct running between an inlet and an outlet, the outlet being located in the wheel arch.

21. The vehicle according to claim 20, wherein:
the vehicle comprises a door sill,
the inlet is located on the door sill, and
the inlet is formed as a groove in the door still which as the duct runs towards the rear of the vehicle becomes enclosed and forms the duct.

22. The vehicle according to claim 1, wherein:
the wheel assembly is a first wheel assembly, the suspension linkage is a first suspension linkage, the cover panel is a first cover panel, the wheel arch is a first wheel arch form a first opening in the underside of the vehicle body, and the vehicle body defines a second wheel arch, the second wheel arch forming a second opening in the underside of the vehicle body; and
the vehicle further comprises:
a second wheel assembly having a rotation axis, the second wheel assembly being positioned in the second wheel arch and extending through the second opening to the underside of the vehicle;
a second suspension linkage running within the second wheel arch, the second suspension linkage coupling the second wheel assembly to the vehicle body to permit motion of the rotation axis of the second wheel assembly relative to the vehicle body, the second suspension linkage comprising a third suspension link coupled between the vehicle body and the second wheel assembly; and
a second cover panel coupled to the third suspension link so that the cover panel moves with the third suspension link, the second cover panel extending across at least part of the second opening so that when the vehicle is in forward motion the second cover panel directs a rearward moving airflow across the second opening.

23. The vehicle according to claim 1, wherein the wheel arch is a rear wheel arch.

* * * * *